United States Patent
Runge et al.

(10) Patent No.: US 6,525,309 B1
(45) Date of Patent: Feb. 25, 2003

(54) OPTOELECTRONIC SENSOR

(75) Inventors: Wolfram Runge, Freiburg (DE); Ralf Paske, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 09/344,812

(22) Filed: Jun. 25, 1999

(30) Foreign Application Priority Data

Jun. 26, 1998 (DE) ..................................... 298 11 486 U

(51) Int. Cl.[7] .............................................. G01R 21/00
(52) U.S. Cl. ................................. 250/231.17; 250/233
(58) Field of Search ....................... 250/227.21, 227.26, 250/227.32, 231.17, 231.18, 232, 233

(56) References Cited

U.S. PATENT DOCUMENTS

| 3,465,352 A | | 9/1969 | Carlson | |
|---|---|---|---|---|
| 5,392,150 A | * | 2/1995 | Inagaki et al. | 359/221 |
| 6,375,358 B1 | * | 4/2002 | Maekawa et al. | 384/107 |

FOREIGN PATENT DOCUMENTS

| DE | 2248768 | | 10/1976 |
|---|---|---|---|
| DE | 3402843 | A1 | 8/1984 |
| DE | 4336137 | A1 | 4/1995 |
| DE | 69124052 | T2 | 5/1997 |
| JP | 2000-55053 | * | 2/2000 |

* cited by examiner

*Primary Examiner*—Frank G. Font
*Assistant Examiner*—Andrew H. Lee
(74) *Attorney, Agent, or Firm*—Townsend and Townsend and Crew LLP

(57) ABSTRACT

An optoelectronic sensor has a light source (10) for the transmission of a scanning beam (11), a light deflection unit (12), which is formed for the periodic deflection of the scanning beam (11) within an angular transmitting range (14), a receiving device for detection light reflected from an object to be sensed and/or back-scattered light, and a deflector (18) which has a light entry surface (20) arranged at least regionally within the angular transmission range (14). The light deflector is formed for the deflection of light incident through the light entry surface (20) onto a photo-detector (22). The photo-detector (22) can be coupled to a synchronization circuit to produce a synchronization pulse for the determination of the start of a sensing period.

25 Claims, 2 Drawing Sheets

OPTOELECTRONIC SENSOR

BACKGROUND OF THE INVENTION

The invention relates to an optoelectronic sensor comprising a light source for the transmission of a scanning beam, a light deflecting unit, which is formed for the periodic deflection of the scanning beam within an angular transmission range, and a receiving device for the detection of light reflected and/or back-scattered from an object to be sensed.

With such sensors objects can be sensed and markings, for example bar codes applied to the objects, can be recognized. In order to be able to evaluate sensed object information a synchronization of the electronic detection and/or evaluation circuit connected to the receiving device with the periodic scanning movement of the scanning beam is required. This signifies that the start of the scanning period, i.e. the point in time at which an active reading process starts and from which point on reflected or back-scattered light is evaluated, must be communicated to the electronic system coupled to the receiving device.

It is an object of the invention to provide an optoelectronic sensor of the initially named kind which permits the determination of the start of the scanning period.

BRIEF SUMMARY OF THE INVENTION

This object is attained by providing a deflection unit which has a light entry surface arranged at least regionally within the angular transmission range, which is formed for the deflection of light incident through the light entry surface onto a photo-detector, and which can be coupled to a synchronization circuit to produce a synchronization pulse to determine the start of a sensing period.

Thus, in accordance with the invention, the determination of the start of a sensing period, i.e. the synchronization, takes place by an optoelectronic route in a simple and almost delay-free manner.

Through the arrangement of the deflection unit within the angular transmission range, no additional space is required for the deflection unit within the sensor. Neither the extent of the angular transmission range nor that of the receiving range for reflected or back-scattered light are notably restricted by the deflection unit.

In accordance with a preferred embodiment of the invention, the deflection unit includes a plate of light-permeable material, preferably formed as an irregular polygon, and in particular as a four-cornered plate, in particular of plastic, the small sides of which are formed as light entry, light exit, and reflection surfaces.

In this way the plate works as a light conductor, in which light incident through a narrow side serving as an entry surface is deflected by reflection or total reflection at the other narrow sides in the direction of an outlet surface. Since such a light conducting plate simultaneously provides light entry, light exit and light reflection surfaces and also serves as a propagation medium for the light, the number of components required for the reflection of the light is minimized by forming the deflection unit as such a light conducting plate.

Furthermore, a light conducting unit of this kind can be made simply and at favorable cost.

In accordance with a preferred embodiment of the invention, the plane defined by the light entry surface of the deflection unit extends at least approximately perpendicular to the direction into which the scanning beam can be deflected before the start of or after the end of a scanning period by the light deflection unit.

In this way the comparatively large side surfaces of the preferably flat, light conducting plate do not face in the direction into which the scanning beam is deflected before the start of or after the end of the scanning period, but rather only their narrow sides do so. As a consequence, only a minimal part of the angular transmission range, which lies outside of an active angular reading range, is influenced by the deflection unit.

The light deflection unit is preferably formed as a polygonal mirror wheel, which is rotationally driven in operation and provided with reflecting mirror facets. The light beam transmitted by the light source produces a light bead on the facets of the mirror wheel, with a finite extent of, for example, a few square millimeters. As a result of this extent, only a part of the light beam, namely only the part of the light beam falling on the relevant facet, is deflected into the desired direction at the start of the scanning period by the front region of the relevant facet in the direction of rotation. This part of the light beam, i.e. the first scanning beam, is in many cases too low in intensity and thus unsuitable or only conditionally suitable for scanning purposes. The same applies to the last scanning beam, which is reflected by a rear region of the respective facet in the direction of rotation.

Accordingly, in accordance with a further preferred embodiment, the deflection unit is arranged in a region into which the scanning beam can be deflected by the light deflection unit before the start of or after the end of a scanning period, in particular by a front or rear marginal region in the direction of rotation of a reflecting facet of a light deflection unit formed as a rotatable polygonal mirror wheel. This makes it possible to use a scanning beam for synchronization purposes, which is not capable of being used for scanning or only conditionally capable of being used for scanning. Accordingly, practically all the light beams fully reflected from the respective facet are available as scanning beams suitable for the actual scanning, so that practically the entire angular transmission range can be used for the scanning, i.e. as an active reading range.

In accordance with further preferred embodiments of the invention, a light exit surface of the deflection unit is matched to a light sensitive surface of a photo-detector, and/or has at least substantially the same size as the light sensitive surface of the photo-detector, and/or the projection of the light exit surface of the deflection unit onto the light sensitive surface of a photo-detector in a direction extending approximately perpendicular to a plane defined by the light exit surface lies fully within the light sensitive surface of the photo-detector.

In this way a situation is achieved in which at least a large part of the light incident on the light entry surface passes to the photo-detector after single or multiple reflection or total reflection at the narrow sides of the plate.

In accordance with a further preferred embodiment of the invention the plate is connected to a base element, which preferably extends perpendicular to the plate and which is provided with positioning spigots projecting preferably perpendicularly for engagement with cutouts formed in a sensor circuit board. In this way it is possible to fix the deflection unit without complicated adjustment work at the desired location and in the desired position on a pre-manufactured circuit board provided with positioning bores. In particular a sensor circuit board, which is in any event present, serves for this purpose, so that—with the exception of the deflection unit—no further components are required.

Further advantageous embodiments of the invention are set forth in the following description and in the drawing.

DESCRIPTION OF THE PREFERRED EMBODIMENTS

Figure 1:
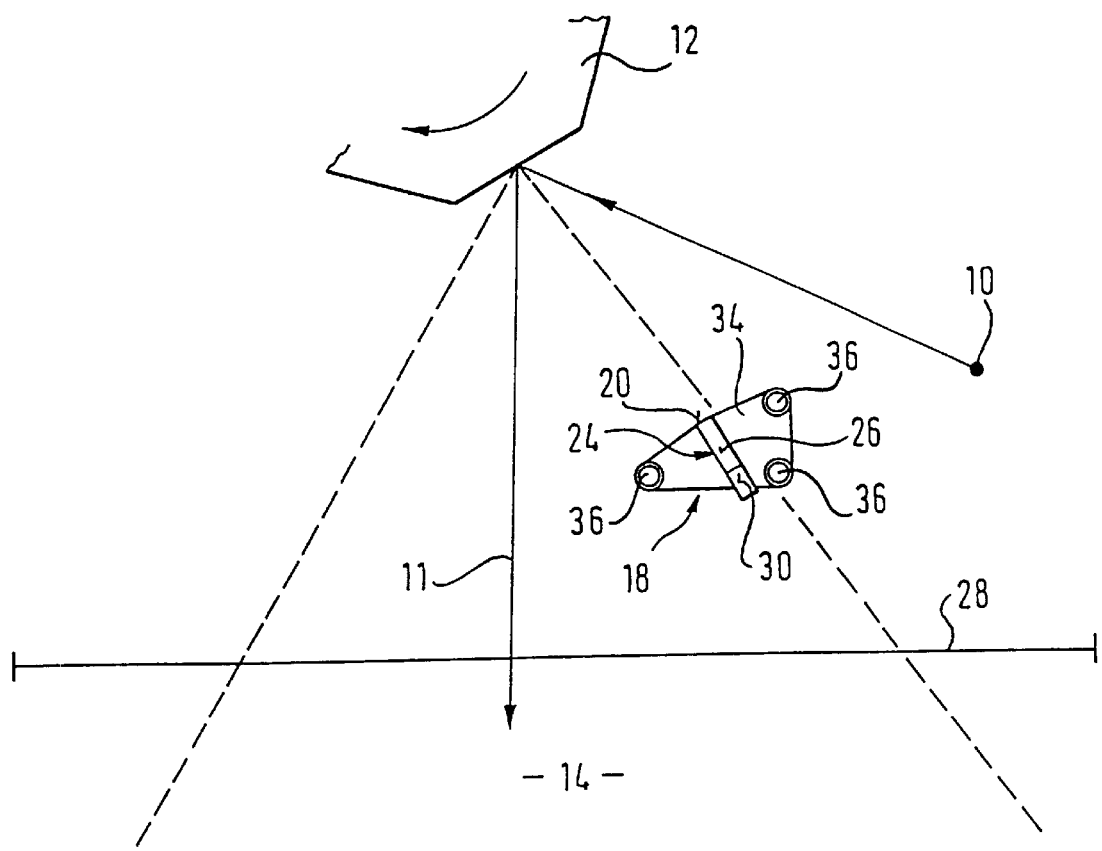
FIG. 1 is a schematic partial view of an embodiment of an optoelectronic sensor in accordance with the invention in a plane parallel to a light transmitting surface.

The schematic representation of FIG. 1 shows the preferred embodiment of an optoelectronic sensor in accordance with the invention. The sensor comprises a light source 10, preferably a laser, which transmits a continuous or pulsed light beam in the direction of a light deflection unit 12, which is only partly shown but which is formed as a polygonal mirror wheel.

Depending on the position of the rotating mirror wheel in the operation of the optoelectronic sensor, the light beam is deflected by one of the reflecting facets of the mirror wheel 12 at a specific angle within a V-shaped angular transmission range 14, which is indicated by broken lines in FIG. 1. After deflection by the mirror wheel, the light beam designated as the scanning beam 11 immediately leaves the sensor via a sensor window 28.

When the mirror wheel 12 turns in the clockwise sense, the scanning beam is first deflected before the start of each scanning period by a front region in the direction of rotation of the relevant facet, in the direction of the right-hand end of the angular transmission range 14, i.e. at the start of the angular transmission range as shown in FIG. 1.

Towards the end of each scanning period, the scanning beam 11 is deflected by a rear region in the direction of rotation of the facet in the direction towards the left-hand end of the angular transmission range 14 in FIG. 1 and then jumps back to the start of the angular transmission range 14.

Light reflected and/or scattered back from an object to be sensed falls through the sensor window 28 onto the mirror wheel 12 and is deflected by its facets onto a non-illustrated receiving device.

The receiving device can be arranged in the area of the light source 10. A semi-permeable mirror can be arranged in the light path between the polygonal mirror wheel 12 and the light source 10 and deflects the reflected receiving light from the mirror wheel 12 onto a receiving device arranged at a suitable position. It is also possible to arrange the receiving device above or below a comparatively thin polygonal mirror wheel.

The light beam transmitted by the light source 10 produces a light bead with a finite extent of, for example, a few square millimeters on the facets of the mirror wheel 12. As a result of this extent, only a part of the scanning beam 11, namely only the part of the light bead which falls on the relevant facet, is deflected at the start of or after the end of each scanning period from the front or rear region of the relevant facet in the direction of rotation into the desired direction. This fraction of the scanning beam 11, i.e. of the first or last scanning beam, is in many cases too low in intensity and thus unsuitable or only conditionally suitable for scanning purposes.

A deflection unit or deflector 18, which is described in more detail with reference to FIG. 2, has a thin plate 24 of light permeable plastic, the one narrow side of which is formed as a light entry surface 20, which is arranged within the angular transmission range 14, but outside of an active reading zone, which is not drawn in. The light entry surface 20 extends approximately perpendicular to the direction into which the scanning beam is deflected before the start of the scanning period. Consequently, that light enters into the deflection unit approximately perpendicularly through the light entry surface 20, i.e. the deflection unit 18 only blends out that light from the angular transmission range which can in any event in many cases not be used for scanning purposes.

A light outlet surface 26, which extends perpendicular to the light entry surface 20, and also a narrow side of the plate 24 formed as the reflection surface 30, can furthermore be seen in FIG. 1.

Moreover, an approximately triangular base element 34 of the deflection unit or deflector 18 is shown in FIG. 1, which is manufactured of the same material as the plate 24 and connected to the plate 24. The base element 34 is provided with three positioning spigots 36, which are each arranged in one of the corners and which can be pushed into corresponding cutouts of a circuit board not shown in FIG. 1 for the positional fixation of the deflection unit 18 within the sensor. The positioning spigots 36 project perpendicularly from the base element 34.

Figure 2:
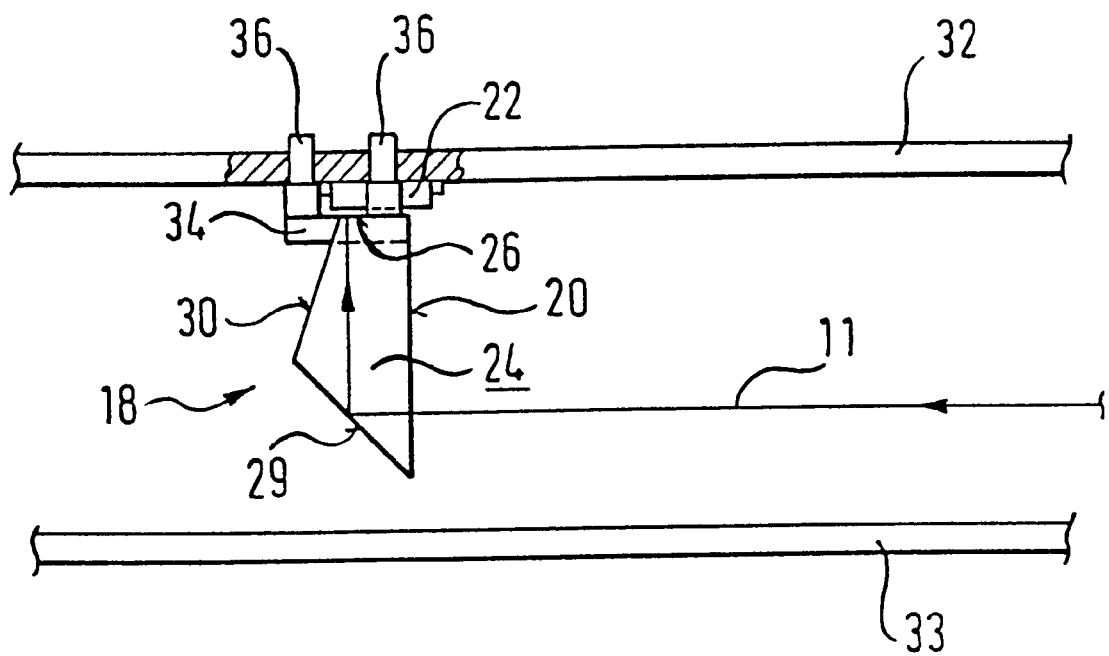
FIG. 2 is a schematic side view of the deflection unit of FIG. 1 in a state fixed to a sensor circuit board.

FIG. 2 shows the deflection unit 18 in a state fixed to a sensor circuit board 32, with the positioning spigots 36 of the base element 34 extending parallel to the circuit board 32 being pushed into cutouts of the circuit board 32. A further sensor circuit board 33, on which the polygonal mirror wheel (not shown) serving as the light deflection unit can be mounted, extends parallel to the circuit board 32. The sensor can, however, also only have one such circuit board, i.e. the sandwich construction of FIG. 2, with circuit boards 32, 33 extending in parallel not being compulsory.

The plate 24 of the deflection unit 18 is formed as an irregular polygon and extends perpendicular to the sensor circuit board 32. The light entry surface 20 of the plate 24 extends perpendicular to an incident scanning beam 11 reflected from the polygonal mirror wheel.

The narrow side 29 of the plate 24 remote from the polygonal mirror wheel and which extends obliquely to an angle of about 45° to the circuit board 32 serves, as does the narrow side 30 which adjoins the light exit surface 26 and likewise extends obliquely to the circuit board 32, as a reflection surface for light incident through the light entry surface 20 into the plate 24. The plate 24 thus serves as a light conductor, in which light incident through the light entry surface 20 propagates by single or multiple reflection or total reflection at the narrow sides of the plate 24 in the direction of the light exit surface 26 and is deflected in this manner to the light exit surface 26.

The plate 24 extends through the base element 34 in such a way that the light exit surface 26 of the plate 24 terminates flush with the base plate 34 at the side confronting the circuit board 32.

Since the plate 24 broadens in funnel-like manner starting from the light exit surface 26, the reflection surface 29, which extends at approximately 45° to the light entry surface 20, can have a greater extent perpendicular to the sensor circuit boards 32, 33—for an unchanged length of the light exit surface 26—without the length of the deflection unit 18 in its direction being enlarged. Furthermore, this reflection surface 29 can have a substantially greater length than the light exit surface 26. Consequently, the deflection unit 18 of the invention can capture light originating from a comparatively large area perpendicular to the sensor circuit boards 32, 33, and deflect it to the comparatively small light exit surface 26.

A photo-detector 22 is arranged between the light exit surface 26 and the sensor circuit board 32 and is fixed on the circuit board 32 between projections and connected to a non-illustrated synchronization circuit. The light sensitive surface of the photo-detector 22 confronts the light exit surface 26 of the deflection unit 18 and extends parallel thereto.

With a thickness of the plate 24 of approximately 1 mm, the light entry surface 20 has a length of about 9.5 mm, the 45° reflection surface 29 has a length of about 6.5 mm, and the light exit surface 26 has a length of about 2.5 mm. The resulting size of the light exit surface 26 corresponds approximately to the size of the light sensitive surface of commercially available, cost-favorable photo-detectors, which are preferably used for the photo-detector 22.

The light exit surface 26 of the deflection unit 18 is approximately of the same size as the light sensitive surface of the photo-detector, or fractionally smaller. The two surfaces are arranged relative to one another in such a way that, on projection of the light exit surface 26 onto the light sensitive surface in the direction perpendicular to the sensor circuit boards 32, 33, both surfaces approximately cover each other, or the light exit surface 26 lies fully within the light sensitive surface.

In the operation of the optoelectronic sensor in accordance with the invention, the scanning beam 11 transmitted by the light source 10 and reflected by the polygonal mirror wheel 12 when rotating in the clockwise sense is periodically deflected within the angular transmission range 14.

As explained above, before each actual scanning period, only a part of the light beam 11 is reflected from the mirror facet of the polygonal mirror wheel 12 active in the scanning period as a scanning beam 11. This part of the scanning beam 11 falls approximately perpendicularly onto the light inlet surface 20 of the deflection unit 18 and is deflected in the direction of the light exit surface 26 and thus onto the light sensitive surface of the photo-detector 22.

Since the plate 24 with a thickness of about 1 mm in the viewing direction of the sensor, i.e. in the direction of the scanning beam 11 reflected by the polygonal mirror wheel 12, only has a small extent, the first or at least one of the first fully reflected scanning light beams can pass undisturbed past the plate 24 through the sensor window 28 and be exploited as a first scanning beam 11 of the scanning period, i.e. of the active reading process.

By means of a circuit connected to the photo-detector 22, the light is used to produce a synchronization pulse. This permits the electronic detection and/or evaluation circuit, which is connected to the receiving device for light reflected from a scanned object, to be synchronized with the scanning movement of the scanning beam 11, i.e. to determine the start of each scanning period. In this manner each information contained in the reflected or back-scattered light can be uniquely associated with a specific scanning period.

A detection threshold of the synchronization circuit connected to the photo-detector 22 can be set such that light which reaches the photo-detector 22 which originates from light beams which are not at least approximately perpendicularly incident on the light entry surface 20 is not sufficient in order to produce a synchronization pulse.

The deflection unit 18 can basically also be arranged at a different position of the angular transmission range 14 in front of or also after the actual active reading range. The angular position, at which the scanning beam 11 falls approximately perpendicularly onto the light entry surface 20 of the deflection unit 18, and produces a synchronization pulse, is known from the relative position of the deflection unit 18 with respect to the polygonal mirror wheel 12. The start of each scanning period can then be derived from the speed of rotation of the polygonal mirror wheel 12.

What is claimed is:

1. Optoelectronic sensor for scanning an object within an angular transmission range and having means for activating a synchronization circuit to produce a synchronization pulse signaling the start of a sensing period comprising a light source for the transmission of a scanning beam, a photo-detector for detecting light and for coupling to the synchronization circuit, a light deflection unit, which is formed for the periodic deflection of the scanning beam within an angular transmission range, a receiving device for detecting light reflected and/or back-scattered from the object, and a deflector which has a light entry surface arranged at least regionally within the angular transmission range and is formed for the deflection of light incident trough the light entry surface onto the photo-detector so that an output of the photo-detector activates the synchronization circuit to produce the synchronization pulse that signals the start of the sensing period, the deflector including a plate of light permeable material formed as an irregular polygon having narrow sides defining light entry, light exit and reflection surfaces.

2. Sensor in accordance with claim 1 wherein the deflector broadens out, starting from a light exit surface.

3. Sensor in accordance with claim 1 wherein the deflector broadens out in funnel-like manner.

4. Sensor in accordance with claim 1 wherein the light entry surface of the deflector extends approximately perpendicular to a transmission plane defined by the periodically deflected scanning beam.

5. Sensor in accordance with claim 1 wherein the deflector has a reflection surface extending obliquely at an angle of about 45° to a transmission plane defined by the periodically deflected scanning beam.

6. Sensor in accordance with claim 1 wherein the deflector has a light exit surface extending approximately parallel to a transmission plane defined by the periodically deflected scanning beam.

7. Sensor in accordance with claim 1 wherein the deflector has a light exit surface optically aligned with a light sensitive surface of the photo-detector and/or has at least substantially the same size as the light sensitive surface of the photo-detector.

8. Sensor in accordance with claim 1 wherein the deflector has a light exit surface the projection of which onto a light sensitive surface of the photo-detector in a direction approximately perpendicular to a plane defined by the light exit surface lies fully within the light sensitive surface of the photo-detector.

9. Sensor in accordance with claim 1 wherein the plate of the deflector has a thickness of approximately 0.5 to 1.5 mm and/or wherein the light entry surface has a length of about 5 to 15 mm.

10. Sensor in accordance with claim 1 wherein the deflector has a light exit surface of a length of 1 to 5 mm and/or a reflection surface of a length of about 3 to 10 mm.

11. Sensor in accordance with claim 1 wherein the deflector is formed for fixing to a sensor circuit board.

12. Sensor in accordance with claim 1 including a base element connected to the plate of the deflector and extending perpendicular to the plate and provided with perpendicularly projecting positioning spigots for engaging cutouts formed in a sensor circuit board.

13. Sensor in accordance with claim 1 wherein the plane defined by the light entry surface of the deflector is approximately perpendicular to a direction of the scanning beam immediately before the start of or after the end of a sensing period.

14. Sensor in accordance with claim 1, characterized in that the deflection unit (18) is arranged in a region into which the scanning beam (11) can be deflected by the light deflection unit before the start of or after the end of the scanning period, in particular by a front or rear marginal region with respect to the direction of rotation of a reflecting facet of a light deflecting unit formed as a rotatable polygonal mirror wheel (12).

15. Sensor in accordance with claim 1 wherein the deflector is formed as a rotatable polygonal mirror wheel having reflecting facets and the deflector is arranged in a region into which the scanning beam is deflected by at least one of a front marginal region and a rear marginal region of the facet as seen in the direction of rotation of the mirror wheel just prior to the start of or just after the end of a scanning period.

16. Sensor according to claim 1 wherein the plate comprises plastic.

17. Sensor according to claim 1 wherein the plate comprises a four-cornered plate.

18. Sensor according to claim 9 wherein the plate of the deflector has a thickness of about 1 mm.

19. Sensor according to claim 9 wherein the light entry surface of the deflector has a length of about 9 to 10 mm.

20. Sensor according to claim 10 wherein the light exit surface of the deflector has a length of about 2.5 to 3 mm.

21. Sensor in accordance with claim 7 wherein the light exit surface of the deflector has substantially the same size as the light sensitive surface of the photo-detector.

22. An arrangement for generating a synchronization pulse when a periodically angularly deflected scanning beam is at a marginal region of an angular transmission range of the scanning beam, the arrangement comprising a light source for generating the scanning beam, a light deflection unit receiving the scanning beam and periodically sweeping the scanning beam over the angular transmission range, a photo-detector for detecting light and operatively coupled to the synchronization circuit, and a deflector having a light entry surface arranged proximate a marginal region of the angular transmission range for receiving light from the light deflection unit and directing the received light onto the photo-detector, the photo-detector generating a signal when the scanning beam is at a marginal region of the angular transmission range which causes the synchronization circuit to produce the synchronization pulse indicating the start of the sensing period.

23. An arrangement according to claim 22 wherein the deflector is arranged so that the light entry surface is substantially perpendicular to the scanning beam when the scanning beam is at least at one of the marginal regions of the angular transmission range.

24. A method for triggering an optical sensing period comprising periodically angularly sweeping a light beam over an angular transmission range terminating at marginal regions of the transmission range by periodically deflecting the light beam over the transmission range, sensing when the deflected light beam is at a marginal region of the transmission range, directing the light beam sensed at one of the marginal regions of the transmission range onto a detector, and signaling the synchronization circuit to start a sensing period when the photo-detector senses the presence of the deflected light beam in at least one of the marginal regions of the transmission range.

25. A method according to claim 24 wherein deflecting includes providing a deflector having a light entry surface for receiving the light beam from the source, and positioning the light entry surface so that it is substantially perpendicular to the light beam when the light beam is deflected into a marginal region of the angular transmission range.

* * * * *